United States Patent [19]

Bailey

[11] 3,999,111
[45] Dec. 21, 1976

[54] GATING SIGNAL CONTROL FOR A PHASE-CONTROLLED RECTIFIER CIRCUIT

[75] Inventor: Ronald B. Bailey, Erie, Pa.

[73] Assignee: General Electric Company, Erie, Pa.

[22] Filed: Nov. 14, 1975

[21] Appl. No.: 632,094

[52] U.S. Cl. .................................. 321/2; 318/139; 318/338; 318/350
[51] Int. Cl.² ...................... H02P 13/16; H02P 7/06
[58] Field of Search .......... 321/2, 12, 40; 318/139, 318/338, 341, 350

[56] References Cited

UNITED STATES PATENTS

| | | | |
|---|---|---|---|
| 3,378,746 | 4/1968 | Weiser | 318/338 |
| 3,466,525 | 9/1969 | Ainsworth | 321/38 |
| 3,551,778 | 12/1970 | Ekstrom | 321/38 |
| 3,622,866 | 11/1971 | Boehringer | 321/2 |
| 3,863,134 | 1/1975 | Pollard | 321/40 |

Primary Examiner—William H. Beha, Jr.
Attorney, Agent, or Firm—James H. Beusse

[57] ABSTRACT

A method and apparatus for controlling the phase retard time of a phase-controlled rectifier circuit in a power conversion system wherein a clock-pulse synchronized alternating voltage source is connected to supply power to the phase-controlled rectifier circuit. The clock pulses controlling the voltage source are detected and delayed for a predetermined time interval prior to their application to the voltage source. A ramp voltage generator synchronized to the clock pulses and a comparator circuit for comparing the ramp voltage signal level to a reference level provide a means for generating gate pulses to control the phase retard time of the phase-controlled rectifier circuit between maximum and minimum retard times. Maximum retard time is established at the occurrence of a clock pulse by applying a gating signal to the rectifier circuit if the rectifier circuit has not been triggered prior to detection of the clock pulse. Further gating signals are inhibited until the alternating voltage source has reversed polarity in response to the delayed clock pulses thus establishing a minimum retard time. The predetermined time interval between detection of the clock pulses and application of the delayed clock pulses to the alternating voltage source is selected to be at least sufficient to allow commutation and achievement of forward voltage blocking ability, by the components of the phase-controlled rectifier circuit.

10 Claims, 2 Drawing Figures

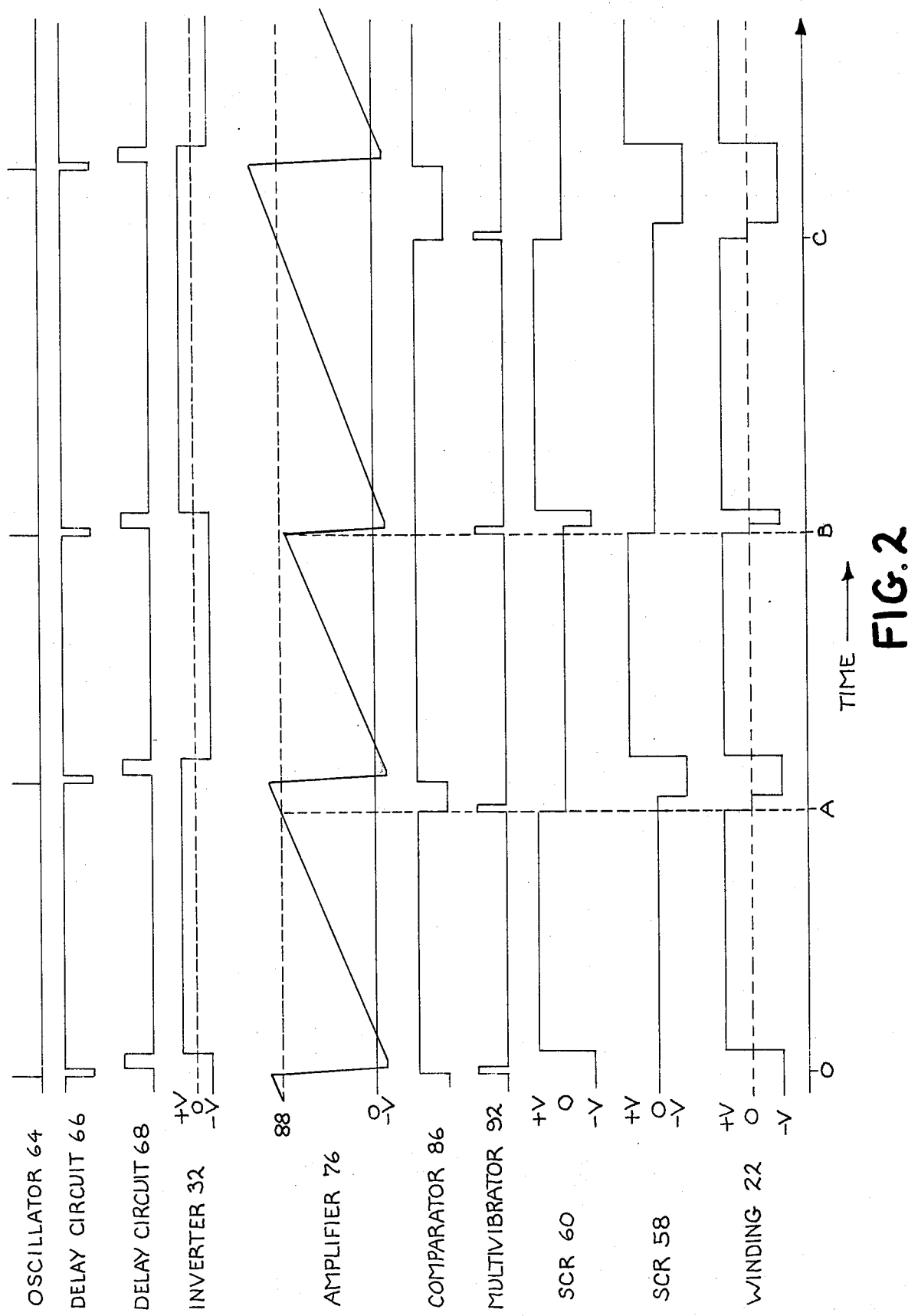

GATING SIGNAL CONTROL FOR A PHASE-CONTROLLED RECTIFIER CIRCUIT

BACKGROUND OF THE INVENTION

The present invention relates to electric power conversion apparatus and, more particularly, to a control arrangement for a full wave phase-controlled rectifier circuit which sometimes operates in an inverting mode.

Rectifier circuits are used to change the form of electric power from alternating current (AC) to direct current (DC). A full wave rectifier circuit transforms AC to DC throughout the entire AC cycle. In a simple single-phase full wave rectifier circuit a pair of unidirectional conducting devices are connected in alternate current carrying paths between a common DC output terminal and a pair of AC input terminals. The unidirectional conducting devices in a solid state rectifier circuit can be diodes, and the AC input terminals are commonly opposite ends of a center-tapped secondary winding of a transformer whose primary winding is connected to a source of alternating voltage. In this solid state rectifier circuit the DC power is delivered to a load circuit connected between common DC output terminal and the center tap of the transformer secondary, each of the diodes conducting load current throughout the half of the AC cycle in which its anode to cathode voltage is positive.

In a phase-controlled rectifier circuit the unidirectional conducting devices are controllable electric valves of the type having the ability to block forward current conduction until turned "on" by a suitable control or gate signal. One family of such valves is generally known by the name "controlled rectifier" or "thyristor," and the invention will be described with reference to this family of controlled switching elements. A detailed explanation of semiconductor controlled rectifiers (SCR) can be found in the General Electric SCR Manual, Fifth Edition, published 1972 by the General Electric Company, Semiconductor Products Department, Syracuse, New York. In a phase-controlled rectifier circuit the initiation of conduction, or turn-on, of each of the valves can be delayed, or retarded in time, after anode-to-cathode voltage of the valve crosses zero in a positive going direction. By this method of control, generally referred to as phase control, the average magnitude of the rectified voltage at the DC output terminals of the phase controlled rectifier circuit can be controlled. If the load circuit connected to the rectifier circuit output terminals is purely resistive, the average magnitude of the rectified voltage can be varied from a maximum at zero retard time to essentially a zero level as the retard time reaches 180 electrical degrees.

When the output terminals of the phase-controlled rectifier circuit are connected to an inductive load circuit, operation of the rectifier circuit deviates from the operation with a resistive load. An inductive load is a load in which current will not normally exhibit an instantaneous change; however, voltage across an inductive load can be changed instantanteously. If, for example, a valve in one current path is gated on at some retarded time and allows current to flow in one direction through an inductive load, current will continue to flow through that valve and the inductive load in that same direction even though the alternating voltage input to the phase-controlled rectifier circuit has reversed polarity. In the situation where the conducting valve is poled such that the voltage initially applied across the inductive load circuit is positive, it can be seen that upon polarity reversal of the alternating input voltage the voltage then appearing across the inductive load circuit will be negative. If the initiation of conduction in each of the alternate current paths is delayed for 90 electrical degrees, the voltage appearing across the inductive load will be positive for one-fourth of the alternating voltage cycle followed by one-fourth of a cycle in which the voltage will be negative. As a result the average voltage across the inductive load will be zero. As the retard time is increased beyond 90 electrical degrees the average voltage appearing across the inductive load circuit becomes negative. When the average DC output voltage becomes negative, it is apparent that power is being transferred from the DC output terminals to the AC input terminals, which condition can subsist only so long as the load circuit connected to the DC terminals is able to supply direct current. This mode of operation is called "inverting," since the flow of power is from the DC to the AC circuit, and the circuit is referred to as an inverting phase-controlled rectifier circuit.

When the phase-controlled rectifier circuit using ideal switching elements is operated in the inverting mode with an inductive load, the turn-on of the switching elements may be delayed to nearly 180°, i.e., a full half-cycle of the AC input voltage, in order to allow a maximum transfer of power from the DC to the AC circuit. In practice, however, such ideal switching elements are not available and the maximum delay of turn-on or phase retard time is limited by the need to provide adequate time to allow current transfer from one switching element to the other before the alternating voltage on the AC input terminals reverses polarity. For example, in a phase-controlled rectifier circuit using SCR's for switching elements the maximum phase retard time is limited by the time required for current flow to transfer from one SCR to the other, generally referred to as "commutation" time, plus the time required for the last conducting SCR to regain its forward voltage blocking capability. If the AC input voltage reverses before the SCR has regained its forward voltage blocking capability, the SCR will act as a rectifier and allow excessive currents to circulate in both the AC and DC circuits.

In many phase-controlled rectifier circuit applications the alternating input voltage is supplied from a stable, constant frequency source. In those systems the time duration of each half-cycle of alternating voltage is constant, and it is relatively simple to assure adequate commutation time. A system for converter control using a relatively constant frequency alternating voltage is shown in U.S. Pat. No. 3,466,525. In this patent phase delay circuits and phase advance circuits are triggered at the zero crossings of the alternating voltage and provide respective output signals to block turn-on of each controlled switch prior to a minimum firing time in each cycle and to enforce turn-on at a maximum firing time if necessary. Because the maximum firing time is fixed with respect to the zero crossing of the alternating voltage, a variation in frequency of the alternating voltage can result in a change of the time duration between the maximum firing time and the next zero crossing. If the frequency were to to increase, the available commutation time will be reduced and may become insufficient to allow valve turn-off.

In some phase-controlled rectifier circuit applications the AC input voltage is supplied from an unstable or variable frequency source, such as, for example, an inverter circuit, an inverter circuit being a circuit for transforming a DC input to an AC output. In an inverter circuit the frequency and the timing of the zero crossings of the Ac output voltage are determined by gating signals supplied to switching elements of the inverter. The switching elements may comprise thyristors or semiconductor controlled rectifiers (SCR) arranged in various known circuit configurations. By cyclically turning on and off the respective controlled rectifiers, an AC output voltage is derived from the DC power that is applied to the inverter input terminals. Any such inverter has to include suitable means for reliably turning off each controlled rectifier at the conclusion of its prescribed interval of load-current conduction and for assuring complete transfer of current from that "outgoing" controlled rectifier to the next-conducting controlled rectifier (the "incoming" rectifier), which transfer is called commutation. Descriptions of numerous types of inverter circuits may be found by reference to the Principles of Inverter Circuits by B. D. Bedford and R. G. Hoft, published in 1964 by John Wiley & Sons, New York, N.Y. For the purpose of describing the present invention, reference will be made to a complementary impulse commutated inverter of the type described in Chapter 7 of the above text although it will become apparent that any gate signal synchronized inverter may be used in the practice of the present invention.

In a complementary impulse-commutated inverter alternately triggered SCR's are connected in alternate load current carrying paths between a source of DC electric power and a load apparatus, in this instance the load apparatus comprising a transformer coupled phase-controlled rectifier circuit. The alternating voltage coupled to the phase-controlled rectifier circuit has a frequency determined by the triggering frequency of the SCR's in the inverter circuit.

In the complementary impulse-commutated inverter, current conduction in one load-current path is terminated by the onset of current conduction in an alternate path. In other words, the outgoing controlled rectifier is commutated through the action of turning on the incoming controlled rectifier. In order to effect commutation, this type of inverter employs impulse-forming series inductance-capacitance circuits associated with each SCR. If the triggering frequency of the inverter circuit SCR's varies or possesses intermittent phase shifts, the resulting perturbations in the alternating voltage supplied to the phase-controlled rectifier circuit may result in an inability of the control circuit to reliably limit the firing times of the SCR's in the rectifier circuit and cause a commutation problem.

It is an object of the present invention to provide an improved method and apparatus for phase control of a variable frequency excited phase-controlled rectifier circuit.

It is a further object of the present invention to provide a method and apparatus well suited for limiting the maximum triggering delay of a phase-controlled rectifier circuit when used in conjunction with an alternating current source whose frequency is subject to variations.

SUMMARY OF THE INVENTION

In carrying out the invention in one form thereof, there is provided, in conjunction with an inverter fed phase-controlled rectifier circuit, a control circuit for developing gating signals to be supplied to the phase-controlled rectifier circuit and to the inverter. The control circuit includes an oscillator for producing periodic clock signals and a delay circuit for delaying the clock signals for a predetermined time interval before applying the delayed clock signals to the inverter. During the predetermined time interval application of gating signals to the phase-controlled rectifier circuit is inhibited to thereby assure that an adequate commutation interval for the phase-controlled rectifier circuit is provided. The control circuit also includes a ramp generator synchronized to the oscillator for producing gating signals to the phase-controlled rectifier at any selected phase retard time between the time at which gating signals are supplied to the inverter and the time at which the next succeeding clock signal occurs. In this manner operation of the phase-controlled rectifier circuit is inhibited for a commutation interval prior to each reversal of the AC input voltage thereby assuring adequate time for the outgoing SCR to achieve forward voltage blocking ability.

DESCRIPTION OF THE DRAWINGS

For a better understanding of the present invention reference may be had to the following description taken in conjunction with the accompanying drawings in which:

FIG. 2 illustrates waveforms taken from selected points of the arrangement of FIG. 1.

DETAILED DESCRIPTION

Figure 1:
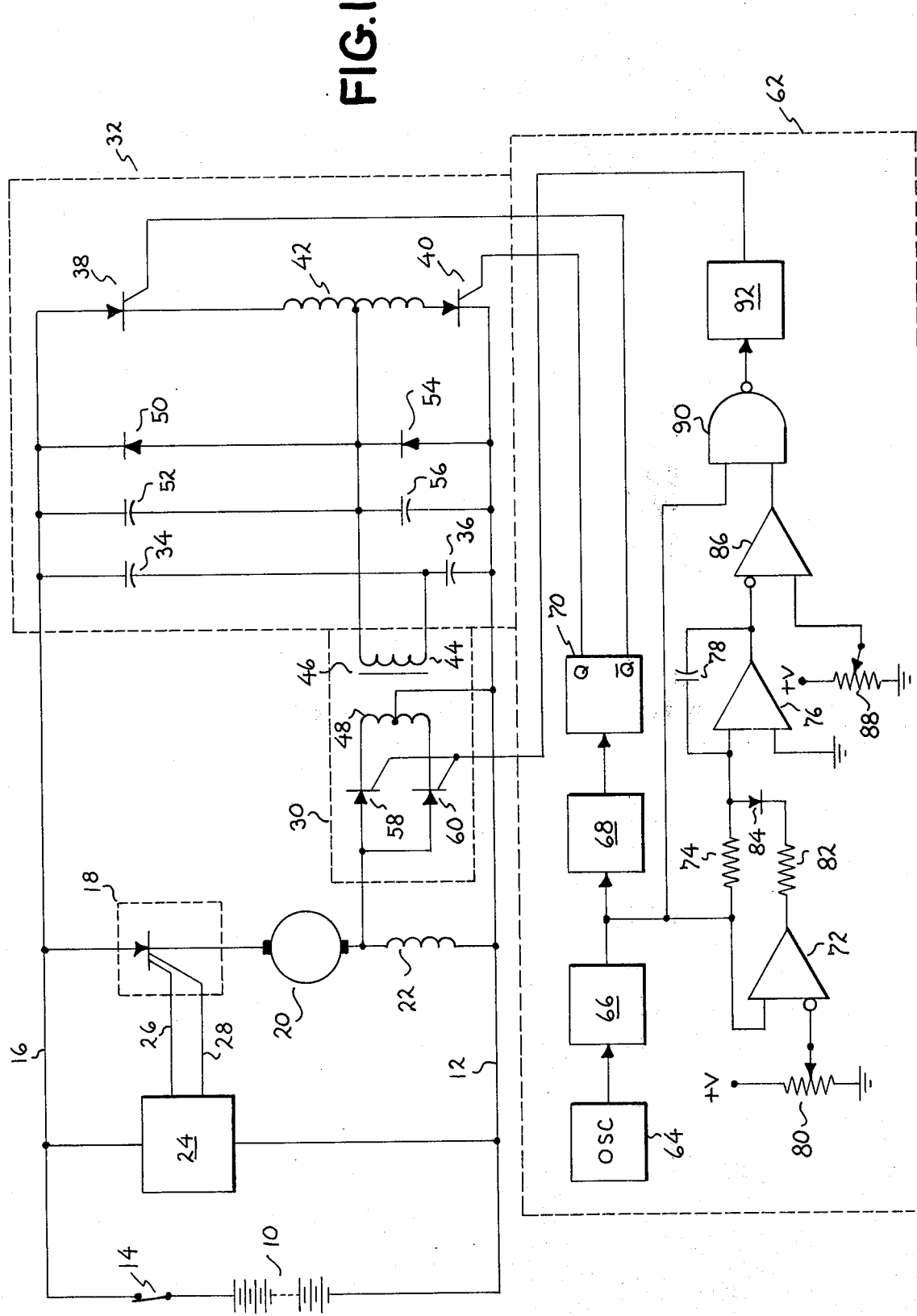
FIG. 1 is a schematic and block diagram of an inverter, phase-controlled rectifier circuit and control apparatus embodying the present invention.

Referring to FIG. 1 there is illustrated one embodiment of the invention in simplified form as may be utilized in a control circuit for a DC electric motor. A source of DC power, illustrated as a battery 10, has a negative terminal connected to the reference or negative bus 12 and has a positive terminal connecting through a power switch 14 to a positive bus 16. A chopper 18, a motor armature 20, and a motor field winding 22 are serially connected between bus 16 and bus 12. As is well known, the chopper is essentially a switch which is periodically opened and closed. Control of the chopper is effected by a chopper control circuit 24 which supplies an ON gating signal to chopper 18 via line 26 and an OFF gating signal to chopper 18 via line 28. The conduction duty cycle of chopper 18 can be controlled by time ratio control of the ON and OFF periods of the chopper. Various types of and operating controls for chopper circuits are disclosed, for example, in the General Electric Company SCR Manual, Fifth Edition, Section 13.2.4 and in U.S. Pat. No. 3,515,970 — Weiser, issued June 2, 1970 and assigned to the General Electric Company. For the purpose of describing the present invention it is sufficient to point out that the motor is energized by periodically operating the chopper 18 to allow current to flow from bus 16 through chopper 18, motor armature 20 and motor field winding 22 to bus 12.

During the initial stage of motor operation the voltage of battery 10 is sufficient to allow the motor to accelerate along a substantially flat torque-speed curve. However, as motor velocity increases, the motor reverse electromotive force (back EMF) or armature generated voltage, increases to the point at which it equals the voltage of battery 10. Below this velocity the motor supplies constant torque. Once the back EMF begins to overcome battery voltage, motor current, and thus motor torque, attempts to decrease. One method of operation above this velocity point is to operate the motor in a constant horsepower mode. In the illustrated system this change to constant horsepower operation is achieved by maintaining a constant armature current and voltage through reduction of field current by a process known as field weakening. Field weakening consists essentially of providing an alternate path in parallel with the field winding for a portion of the armature current. In this system field weakening is accomplished by means of a converter circuit including a phase-controlled rectifier circuit 30 and an inverter circuit 32, the latter being hereinafter referred to as inverter 32.

Inverter 32 may comprise any one of a number of different types of well-known clock pulse synchronized inverters, but for illustrative purposes will be described as being of the type known as a complementary impulse commutated inverter. Inverter 32 includes a pair of filter capacitors 34 and 36, serially connected between bus 16 and bus 12, the filter capacitors acting to make the power source 10 appear to be a center-tapped power source. Conversion of the DC input power to AC output power is accomplished by means of first and second controllable switching means, such as thyristors or silicon controlled rectifiers (SCR) 38 and 40. It should be noted that the SCR is a controllable electronic switch having anode, cathode and gate electrodes or terminals and is a unidirectional device in that current can be conducted only when the anode is biased at a positive voltage or potential with respect to the cathode. The condition of the anode being in a positive potential with respect to the cathode is referred to as a forward bias or voltage, and a condition wherein the cathode is at a positive potential with respect to the anode is referred to as a reverse bias condition. When the SCR is forward biased, a signal applied to the gate terminal will cause the SCR to begin conducting current. Current conduction can be terminated only by reducing the current below a minimum threshold or sustaining level by applying, for example, a reverse bias to the SCR. The anode of SCR 38 is connected to bus 16 and the cathode of SCR 38 is connected to one end of a center-tapped inductor 42. The opposite end of inductor 42 is connected to the anode of SCR 40, the cathode of this latter SCR being connected to bus 12. The center-tap of inductor 42 is connected to a first terminal of a primary winding 44 of an output transformer 46. A second terminal of winding 44 is connected to the junction of capacitors 34 and 36. An alternating current output is provided by the secondary winding 48 of transformer 46, to which winding 48 there is connected the phase-controlled rectifier 30. The combination of transformer 46 and phase-controlled rectifier circuit 30 appears as an inductive load to inverter 32.

The SCR 40 is commutated or turned off by the action of the circuit including inductor 42, a free wheeling diode 50 and a capacitor 52 connected in parallel with diode 50. The anode of diode 50 is connected to the center-tap of inductor 42 and the cathode of diode 50 is connected to the anode of SCR 38. The circuit for commutating SCR 38 includes inductor 42, a diode 54, and a capacitor 56 connected in parallel with diode 54, diode 54 having its anode connected to the cathode of SCR 40 and its cathode connected to the center-tap of inductor 42.

Phase-controlled rectifier circuit 30 comprises a pair of controlled rectifiers (SCR) 58 and 60 having cathodes connected respectively to opposite ends of winding 48. The anodes of SCR's 58 and 60 are connected to a common junction intermediate armature 20 and field winding 22.

In accordance with the present invention, gating signals are supplied to phase controlled rectifier circuit 30 and inverter 32 by gating signal control circuit 62. Control circuit 62 includes a clock oscillator 64 of a type well known in the art for continuously generating clock pulses. An output terminal of oscillator 64 is connected to an input terminal of a first delay circuit 66, which delay circuit may comprise, for example, a monostable multivibrator. An output terminal of delay circuit 66 is connected to an output terminal of a second delay circuit 68, which second delay circuit may also comprise a monostable multivibrator. An output terminal of delay circuit 68 is connected to a clock input terminal of a flip-flop 70 of a type well known in the art having a Q output terminal and an inverted or $\overline{Q}$ output terminal. The Q and $\overline{Q}$ output terminals of flip flop 70 are connected respectively to the gate terminals of SCR's 40 and 38 for providing gating signals to control the operation of inverter 32.

Gating signals for phase-controlled rectifier circuit 30 are provided by a circuit including a first comparator 72 having a first input terminal connected to an output terminal of delay circuit 66. A resistor 74 connects the output terminal of delay circuit 66 to a first input terminal of an operational amplifier 76. A capacitor 78 connected from the first input terminal to an output terminal of amplifier 76 causes amplifier 76 to operate in an integrating mode, i.e., the amplifier-capacitor combination form a ramp generator which is synchronized to the clock pulses from delay circuit 66. A second input terminal of comparator 72 is connected to a movable tap on a potentiometer 80 for establishing a reference potential, one end of potentiometer 80 being connected to bus 16 and the other end being connected to bus 12. An output terminal of comparator 72 is connected through resistor 82 and a diode 84 to the first input terminal of amplifier 76. A second input terminal of amplifier 76 is connected to bus 12 for establishing a reference level.

The output terminal of amplifier 76 is connected to a first input terminal of a second comparator 86, a second input terminal of comparator 86 being connected to a movable tap on a potentiometer 88. The end terminals of potentiometer 88 are connected respectively to bus 16 and bus 12. Adjustment of potentiometer 88 sets a reference level for comparator 86. An output terminal of comparator 86 is connected to a first input terminal of a NAND gate 90, a second input terminal of NAND gate 90 being connected to the output terminal of delay circuit 66. NAND gate 90 has an output terminal connected to an input terminal of a monostable multivibrator 92, gate 90 functioning to supply trigger signals to multivibrator 92. An output terminal of multivibrator 92 is connected to the gate terminals of both SCR 58 and SCR 60 in phase-controlled rectifier circuit 30 for providing gating signals thereto.

Before beginning a discussion of the operation of the circuit of FIG. 1 it should be noted that it has been assumed that the DC power source is a stable source. If the illustrative embodiment were part of a locomotive or transit car system, for example, the DC power source would not be stable and such components as potentiometers 80 and 88 would of necessity be replaced by more suitable circuitry, well known in the art, for developing stable reference potentials.

The operation of inverter 32, phase-controlled rectifier circuit 30, and chopper 18 are well known in the art and will not be dwelled upon except to the extent necessary to a complete understanding of the inventive control circuit. When switch 14 is closed, power from DC source 10 is applied to chopper 18 and to inverter circuit 32. Under command of chopper control circuit 24, chopper 18 begins periodically switching and allowing the current to flow from bus 16 through armature 20 and field winding 22 to bus 12. During acceleration the battery 10 supplies armature and field current at the demanded rate until the speed has reached a level at which the back EMF of the motor equals the voltage of battery 10. Of course, more current could be supplied if the voltage of battery 10 could be increased. Since it is not practical to increase the voltage of battery 10, an alternative method called field weakening is employed to maintain armature voltage constant with increasing speed by reducing field excitation and thereby to maintain armature current at a desired level. Field weakening is accomplished by providing a path for armature current which allows the current to bypass the motor field winding. In the control system of FIG. 1 the bypass or shunt path is provided by phase-control rectifier circuit 30. Since it is desired to operate the motor without field weakening until such time as the battery 10 is unable to supply the demanded armature current, the conduction time of SCR's 58 and 60 must initially be sufficiently delayed to allow voltage on field winding 22 to attain the level that it would normally attain without field shunting. It will be recognized that this delay in conduction of SCR's 58 and 60 is taken with respect to the phase of the excitation voltage on winding 48.

Considering first the operation of gate signal control circuit 62 it can be seen that when oscillator 64 generates a clock pulse, which pulse is then applied to delay circuit 66, a delayed clock pulse is then produced by delay circuit 66. After a first predetermined time interval delay circuit 66 applies a delay clock pulse to delay circuit 68, which circuit 68 after a second predetermined time interval provides a clock pulse to flip flop 70. It will be appreciated that when power was first applied to the circuit 62, flip flop 70 provided a gate signal to either SCR 38 or SCR 40 since either the Q or the $\overline{Q}$ output terminal went to a positive potential. Assuming that the $\overline{Q}$ output signal was initially at a positive potential, SCR 38 was gated into conduction allowing current to flow through the upper half of inductor 42, through primary winding 44 and capacitor 36 back to the battery 10. During this time capacitor 56 charges to essentially battery voltage. When the clock pulse from delay circuit 68 is applied to flip flop 70, flip flop 70 changes state such that the Q output signal goes to a positive potential and the $\overline{Q}$ output signal goes to a low reference level thereby applying a gating signal to SCR 40 and removing the gating signal from SCR 38. SCR 40 is gated into conduction providing a current discharge path for capacitor 56. As capacitor 56 discharges through the lower section of inductor 42 and SCR 40, the voltage developed across the lower section of inductor 42 is coupled to the upper section of inductor 42. This coupled voltage is sufficient to cause a current to circulate around the loop comprising diode 50, SCR 38 and the upper section of inductor 42. With current passing through diode 50, the voltage drop across diode 50 and thus across the combination of SCR 38 and the upper section of inductor 42 becomes very small. Accordingly the induced voltage across the upper section of inductor 42 reverse biases SCR 38 and allows it to cease conducting. Load current now flows from bus 16 through capacitor 34, primary winding 44, the lower section of inductor 42 and through SCR 40 to bus 12. It should be noted that current flows in alternate directions through winding 44 in dependence upon whether SCR 38 or SCR 40 is conducting. Furthermore, the switching action of SCR 38 and SCR 40 is such that the current through winding 44 is essentially a periodic square wave.

For a clearer understanding of the operation of circuit 62, reference is made to the waveforms of FIG. 2. The first waveform, labeled "oscillator 64," represents the clock pulse signals from clock oscillator 64. The clock pulse signals have been shown as occurring at random intervals in order to demonstrate the ability of the subject invention to compensate for such variations. The clock pulse signals from oscillator 64, when applied to delay circuit 66, cause delay circuit 66 to produce output signals of the type identified in FIG. 2 as "delay circuit 66" signals. It will be noted that the leading edge of each of the delay circuit 66 signals coincides with the oscillator 64 signals and that the trailing edge of each delay circuit 66 signal is delayed a predetermined amount. The trailing edge of each delay circuit 66 signal triggers delay circuit 68 causing production of the signals identified as "delay circuit 68" in FIG. 2. Each of the delay circuit 68 signals has a predetermined time duration, the total time interval from the leading edge of the delay circuit 66 signal to the trailing edge of the delay circuit 68 signal being sufficiently long to allow commutation between SCR's 58 and 60 and to allow the outgoing SCR to regain its forward voltage blocking capability. The trailing edge of the delay circuit 68 signal triggers flip flop 70, which flip flop then changes state thereby removing the gating signal from one of the SCR's 38 and 40 and applying a gating signal to the other of these SCR's. As discussed previously, the change of state of flip flop 70 causes inverter 32 to change the direction of load current in transformer 46 and results in generation of an alternating current output.

When the signal from delay circuit 66 goes to a low level relative to the reference level established by potentiometer 80, the voltage at the output terminal of comparator 72 drops to a negative level thereby enabling a current discharge path of capacitor 78 through diode 84, resistor 82 and comparator 72. The value of resistor 82 is chosen to be such as to rapidly pull the voltage at the output terminal of amplifier 76 to a negative saturation level. This saturation level is shown in FIG. 2 on the "amplifier 76" waveform as a small, flat portion at the beginning of each ramp section. The rate of rise of each ramp section is determined by several factors including the voltage level at the output of delay circuit 66, the value of resistor 74, the value of capacitor 78 and the gain factor of amplifier 76.

When the signal from delay circuit 66 reverts to its normal positive level, the signal level at the output terminal of amplifier 76 begins to increase at a substantially linear rate to produce the ramp voltage. The ramp voltage is compared in comparator 86 to a preset voltage from the potentiometer 88. In FIG. 2 the preset voltage from comparator 88 is shown as a voltage level "88" in conjunction with the amplifier 76 waveform. When the ramp voltage achieves a level corresponding to the preset voltage of potentiometer 88, the voltage level at the output terminal of comparator 86 drops to a low reference level corresponding to a logic 0 signal. This logic 0 signal is applied to NAND gate 90 causing the voltage level at the output terminal of NAND gate 90 to go to a positive voltage level and to trigger monostable multivibrator 92. Multivibrator 92 responds to the signal from NAND gate 90 and produces an output pulse, which pulse is applied as a gating signal to both SCR 58 and SCR 60.

Referring particularly to the waveform labeled "inverter 32" in FIG. 2, which is the output voltage of transformer 46 measured from the center tap of winding 48 to the cathode of SCR 58, it can be seen that the gating pulse from multivibrator 92 at the time indicated as "A" occurs during an interval in which SCR 58 is conducting and SCR 60 is non-conductive. It can also be seen that the cathode of SCR 60 is at a negative potential with respect to its anode. Accordingly, the gate pulse at the time A causes SCR 60 to become conductive. As SCR 60 starts to conduct current, the voltage drop across SCR 60 becomes negligible and results in a negative voltage appearing across the leakage reactance of transformer 46, i.e., the output voltage of transformer 46 is dropped between the primary winding 44 and secondary winding 48. Due to the inductive nature of transformer 44 a finite time period is required before current in SCR 58 can cease. This is indicated by the period where both SCR 58 and SCR 60 are conducting current. After current has ceased flowing and SCR 58 is reversed biased, a second finite time period exists before SCR 58 regains its forward voltage blocking capability. By reset of the ramp function as soon as a clock pulse is produced by oscillator 64 and by assuring that a predetermined delay occurs before inverter 32 changes state, a time sufficient for SCR 58 and SCR 60 to commutate and regain forward voltage blocking ability is assured.

A further advantage of the present invention is illustrated with respect to the situation occurring at time "B" in FIG. 2. At this instant oscillator 64 produces a clock pulse before amplifier 76 has produced a voltage level sufficient to cause comparator 86 to change its output voltage level. In order to provide adequate time for SCR's 58 and 60 to switch, the logic 0 output pulse from delay circuit 66 is directed into NAND gate 90 causing NAND gate 90 to produce a trigger pulse to multivibrator 92. Multivibrator 92 then produces a gating signal to SCR's 58 and 60 as shown in FIG. 2. Since the gating signal at time B occurs at a time coincident with the oscillator 64 clock pulse, adequate time for commutation of SCR's 58 and 60 is still provided by the time delays of delay circuit 66 and delay circuit 68 before inverter 32 is triggered and changes state. It will be obvious that this additional logic 0 signal to NAND gate 90 from delay circuit 66 will not effect operation of circuit 62 under normal conditions since comparator 86 would have previously triggered multivibrator 92 and would have initiated switching of inverter 32 before the additional logic 0 signal would occur.

While the principles of the invention have now been made clear in an illustrated embodiment there will be immediately obvious to those skilled in the art many modifications, constructions and arrangements used in the practice of the invention which are particularly adapted for specific environments and operating requirements without departing from these principles. The appended claims are therefore intended to cover and embrace any such modifications, subject only to the true spirit and scope of the invention.

What I claim as new and desire to secure by Letters Patent of the United States is:

1. In an electric power converter comprising an inverter circuit having DC source terminals and AC load terminals a phase-controlled rectifier circuit having AC source terminals and DC terminals adapted to be connected to an electric load, each of said circuits including at least a pair of controllable electric valves forming alternately conducting paths which interconnect the DC and AC terminals of that circuit, and means for coupling the AC terminals of said rectifier circuit to the corresponding terminals of said inverter circuit, improved means for controlling the gating of the valves in said circuits comprising:
   a. a source of periodic clock signals;
   b. first means responsive to successive clock signals for alternately supplying to the valves in said inverter circuit gating signals which are delayed with respect to the clock signals by a predetermined time interval;
   c. second means operative in delayed response to successive clock signals for effectively alternately supplying to the valves in said rectifier circuit gating signals which are delayed with respect to the clock signals by variable time intervals;
   d. means for varying said variable time intervals as desired; and
   e. said second means including means effective throughout said predetermined time interval for inhibiting operation thereof, whereby gating signals cannot be supplied to the valves in said rectifier circuit during the time between a clock pulse and the next gating of a valve in said inverter circuit.

2. The invention as defined in claim 1 wherein said second means further includes means effective when one of said variable time intervals exceeds the period between two consecutive clock signals for supplying a gating signal to the non-conducting valve in said rectifier circuit in substantially immediate response to the occurrence of the second of said two clock signals.

3. The apparatus as defined in claim 2 wherein said first means comprises:
   i. a frist time delay circuit for producing a first signal a first predetermined time interval after receipt of each of said clock signals;
   ii. a second time delay circuit connected to receive said first signal and responsive thereto to produce a second signal a second predetermined time after receipt of said first signal;
   iii. bistable means having first and second output terminals, said first and second output terminals being connected respectively to control the valves in first and second alternate load current carrying paths of said inverter circuit, said bistable means being connected to receive said second signal and being responsive to each of said second signals to alternately provide gating signals at said first and second output terminals.

4. The apparatus as defined in claim 3 wherein said second means comprises:
  i. ramp generator means connected to produce a ramp voltage signal, said ramp generator means being connected to receive and being responsive to said first signal to be reset to an initial condition whereby said ramp voltage signal is synchronized to said first signal;
  ii. comparator having a first input terminal connected to receive said ramp voltage signal and a second input terminal connected to receive a reference voltage signal, said comparator producing a third signal when said ramp voltage signal amplitude exceeds said reference voltage signal amplitude; and
  iii. logic means connected to receive said third signal, said logic means producing said gating signals for said rectifier circuit in response to said third signal.

5. The apparatus as defined in claim 4 wherein said logic means comprises:
  i. logic gate means having a first input terminal connected to receive said third signal and a second input terminal connected to receive said first signal for producing a fourth signal upon receipt of either said first or said third signals; and
  iii. multivibrator connected to receive said fourth signal, said multivibrator producing gating signals to be applied to control said rectifier circuit in response to said fourth signal.

6. The apparatus as defined in claim 5 wherein said ramp generator means is forced to a negative saturation level upon receipt of said first signal whereby production of said gating signals for said rectifier circuit is inhibited during said predetermined time interval.

7. Apparatus for controlling the phase retard time of a power conversion system of the type including a phase-controlled rectifier circuit, a gate pulse synchronized inverter for producing an AC output voltage, and means for coupling the AC output voltage to the phase-controlled rectifier circuit, said apparatus comprising:
  a. a source of periodic clock pulses;
  b. first delay means connected to said source, said first delay means being responsive to a clock pulse from said source to generate a first signal having a first predetermined time duration;
  c. second delay means connected to receive said first signal and responsive thereto to generate a second signal having a second predetermined time duration;
  d. ramp generation means connected to receive said first signal, said ramp generation means being effective to produce a third signal uniformly changing in a first direction during the time duration of said first signal and thereafter uniformly changing in a second direction;
  e. reference means for producing a reference signal;
  f. comparison means connected to receive said reference signal and said third signal, said comparison means producing a first gating signal when said third signal attains a value corresponding to said reference signal;
  g. means for coupling said first gating signal to said phase-controlled rectifier circuit to thereby control the average magnitude of the rectified voltage output of said rectifier circuit;
  h. means responsive to said second signal for producing a second gating signal; and
  i. means for coupling said second gating signal to said inverter whereby said inverter output voltage changes polarity in response to said second gating signal.

8. The apparatus as defined in claim 7 and including means for coupling said first signal to said phase-controlled rectifier circuit.

9. A method for controlling the phase retard time of a phase-controlled rectifier circuit in a power conversion system of the type including a source of periodic clock pulses and a clock pulse synchronized alternating current source for supplying alternating current power to said phase-controlled rectifier circuit, said method comprising the steps of:
  a. delaying said clock pulses for a predetermined time period to produce delayed clock pulses;
  b. applying said delayed clock pulses to control operation of said alternating current source;
  c. delaying said clock pulses for a variable time period greater than said predetermined time period but no greater than the interval between successive clock pulses to produce gating singals; and
  d. applying said gating signals to control operation of said phase-controlled rectifier circuit.

10. The method as defined in claim 9 and including the further step of also producing gating signals simultaneously with said clock pulses.

* * * * *